US011881638B2

(12) United States Patent
Canete Cabeza et al.

(10) Patent No.: US 11,881,638 B2
(45) Date of Patent: Jan. 23, 2024

(54) ULTRA-LOW-PROFILE LOW FREQUENCY ANTENNA

(71) Applicant: PREMO, SA, Campanillas (ES)

(72) Inventors: Claudio Canete Cabeza, Benalmadena (ES); Francisco Ezequiel Navarro Perez, Barcelona (ES); Jorge Rodriguez, Malaga (ES); Sergio Cobos Reyes, Malaga (ES); Antonio Rojas Cuevas, Malaga (ES)

(73) Assignee: PREMO, SA, Campanillas (ES)

( * ) Notice: Subject to any disclaimer, the term of this patent is extended or adjusted under 35 U.S.C. 154(b) by 262 days.

(21) Appl. No.: 17/606,348

(22) PCT Filed: Feb. 20, 2020

(86) PCT No.: PCT/EP2020/054502

§ 371 (c)(1),
(2) Date: Oct. 25, 2021

(87) PCT Pub. No.: WO2020/216494

PCT Pub. Date: Oct. 29, 2020

(65) Prior Publication Data

US 2022/0224011 A1 Jul. 14, 2022

(30) Foreign Application Priority Data

Apr. 24, 2019 (EP) .................................... 19382311

(51) Int. Cl.
*H01Q 7/06* (2006.01)
*H01Q 1/40* (2006.01)
*H01Q 1/24* (2006.01)

(52) U.S. Cl.
CPC ................ *H01Q 7/06* (2013.01); *H01Q 1/40* (2013.01); *H01Q 1/243* (2013.01)

(58) Field of Classification Search
CPC ............ H01Q 7/06; H01Q 1/40; H01Q 1/243; H01Q 1/3241; H01Q 1/14; H01Q 1/2225;
(Continued)

(56) References Cited

U.S. PATENT DOCUMENTS

| | | | | |
|---|---|---|---|---|
| 7,042,411 | B2 | 5/2006 | Yagi et al. | |
| 2003/0222829 | A1* | 12/2003 | Kitahara | H01Q 7/08 343/788 |

(Continued)

FOREIGN PATENT DOCUMENTS

| | | | |
|---|---|---|---|
| EP | 2911244 | A1 | 8/2015 |
| EP | 3033803 | B1 | 5/2017 |

(Continued)

OTHER PUBLICATIONS

International Search Report and Written Opinion for PCT/EP2020/054502, 10 pages, dated Apr. 21, 2020.

*Primary Examiner* — David E Lotter
(74) *Attorney, Agent, or Firm* — Lucas & Mercanti, LLP

(57) ABSTRACT

An ultra-low-profile low frequency antenna including a magnetic core having coil winding channels in three intersecting axial directions orthogonal to each other, defining X-axis (X), Y-axis (Y) and Z-axis (Z), receiving respective X-coil (DX), Y-coil (DY), and Z-coil (DZ). A Z-coil winding channel surrounds the magnetic core around the Z-axis (Z), providing partial grooves confined between two parallel surfaces. The thickness of the magnetic core in the Z-axis (Z) is less than 1.2 mm. Each partial groove has a width in the Z-axis (Z) equal or less than 0.4 mm and its depth in a radial direction perpendicular to the Z-axis (Z) is at least two times of its width. The Z-coil (DZ) is wound within said groove and extends radially from ⅓ to ⅔ of the groove's depth. The outer edge of the Z-coil is at the entrance of the groove.

12 Claims, 6 Drawing Sheets

(58) Field of Classification Search
CPC . H01Q 21/29; H01Q 1/22; H01Q 1/32; H01F 41/0246; H01F 17/0033; H01F 2005/027
See application file for complete search history.

(56) References Cited

U.S. PATENT DOCUMENTS

| | | | | |
|---|---|---|---|---|
| 2013/0033408 | A1* | 2/2013 | Miki .................... | H01Q 1/3241 343/788 |
| 2017/0282858 | A1 | 10/2017 | Sass | |
| 2017/0291579 | A1 | 10/2017 | Miyazawa | |
| 2017/0320465 | A1 | 11/2017 | Lin | |

FOREIGN PATENT DOCUMENTS

| | | | |
|---|---|---|---|
| EP | 3493325 | A1 | 6/2019 |
| ES | 2460368 | A1 | 5/2014 |
| JP | 2003092509 | A | 3/2003 |
| JP | 4007332 | B2 | 11/2007 |
| JP | 2017123547 | A | 7/2017 |
| KR | 20170120497 | A | 10/2017 |
| WO | 2017076959 | A1 | 5/2017 |

* cited by examiner

ULTRA-LOW-PROFILE LOW FREQUENCY ANTENNA

CROSS REFERENCE TO RELATED APPLICATION

This Application is a 371 of PCT/EP2020/054502 filed on Feb. 20, 2020, which claims priority of European Patent Application No. 19382311.9 filed Apr. 24, 2019, both of which are incorporated herein by reference.

TECHNICAL FIELD

This invention concerns to an ultra-low-profile triaxial low frequency antenna of very small size able to be integrated in a mobile phone, such as a smartphone.

The expression ultra-low-profile is to be understood here to a thin antenna having an extreme low thickness, in a range smaller than 1.6 mm, and preferably less than 1.4 mm, specially adapted for being included in a mobile phone. Being said antenna triaxial it can ensure the reception of signals from any direction and/or the transmission of signals to all directions simultaneously. This kind of antennas include a magnetic core having coil winding channels in three intersecting axial directions orthogonal to each other, the coil winding channels receiving three orthogonal coils (of electroconductive wire) surrounding the magnetic core.

Low frequency is typically the designation for radio frequencies in the range of 30 kHz to 300 kHz.

Therefore, the present invention provides an antenna specially designated to be small in size, to have a thickness small enough to permit its integration in a smartphone, and to withstand the requirements of a mobile phone, for example the bending resistance.

As will be understood, the proposed antenna can be also integrated in other portable devices in which the thickness is a relevant design parameter and a limitation for the integration of elements therein, as for example extension tablets, cards-key, etc.

STATE OF THE ART

Many triaxial antennas are known in the state of the art, and the problem of reducing its high has been faced by many different documents, disclosing solutions directed to RFID Keyless Entry Systems with 3D Antennas to be assembled onto a PCB in a key fob, and even solutions for 3D sensing in Card type key fobs; however, to date no monolithic (single core) antennas are known for smartphones, keeping the sensitivity, ultra-low-profile, limited area and flexibility requirements necessary for its integration within a mobile phone.

U.S. Pat. No. 7,042,411 discloses a small-scale triaxial antenna coil, that is used in a receiver or the like of a radio-controlled keyless entry system. This antenna has a low-profile, in this case using a magnetic core having a flattened drum-like shape and a base fixed to one lower face of the core, the magnetic core having three orthogonal coil winding channels there around. In this example, the magnetic core is shaped by including a perimetric recess which defines the coil winding channel for the perimetric Z-coil. This recess is very hard to be produced by molding in an ultra-low-profile magnetic core because the production of said small core requires a complex mold with at least four independent movable parts and a magnet core of this size will probably broke during the un-molding operations. This recess cannot be machined because the magnetic core will also be broken during said machining operation.

Document US2013033408A1 describes a flat triaxial antenna like the antenna described on the previously discussed document. In the US2013033408A1 the magnetic core is obtained by the attachment of two independent core members one of them flat and thin and both core members fixed by means of a bobbin comprising an annular portion functioning as a space for disposing the Z-axis coil.

In this solution the coils or windings are wound surrounding said multi-layer magnetic core, and both members of the magnetic core need to include notches for the X-winding and for the Y-winding that surround it. In the regions where the Z-winding is overlapped with the X-winding or the Y-winding, said notches prevent the magnetic core to be close to the Z-winding so reducing the surface of magnetic core facing the Z-winding and therefore producing a limited Z-winding sensitivity.

Furthermore, in the US2013033408A1 each independent flat magnetic member of the magnetic core includes cantilever regions on each corner, being said cantilever regions of one member of the magnetic core spaced apart from the cantilever regions of the other member of the magnetic core defining in-between the Z-coil winding channel. Both members of the magnetic core are attached to each other and surrounded by the X-winding and by the Y-winding, therefore the distance between said cantilever regions, in the Z-axis direction, is smaller than the height of the X-winding and the Y-winding in the Z-axis direction, producing a Z-winding with a limited height in the Z-axis direction, and therefore further reducing the Z-winding sensitivity.

Denso document JP4007332 claims an integrated low-profile antenna; this type of antenna however is not monolithic not for LF, and the solution proposed is low-profile but extended in the other dimensions.

Furthermore, there are plenty of keyless entry systems and antennas for keyless entry systems known in the art, e.g. US2017320465; US2017291579; US2017282858; JP2017123547. Likewise, specific inventions of triaxial monolithic antennas have been described for key fobs in keyless entry systems (like PREMO patents EP2911244; WO2013EP03888; WO2017076959; ES2460368).

Other solutions of triaxial monolithic antennas have been put on the market for example by companies TDK, Pecos, Sumida, Toko and Neosid.

However, until now, none of the known solutions solve the challenges to integrate an antenna in a smartphone (profile lower than 1.65 mm, area lower than 14×14 mm) withstanding bending test and with a minimum sensitivity over 50 mV/A my in Z-axis.

The very tight mechanical constrains makes that the Z-axis has very limited sensitivity. In order to maximize Z sensitivity, the state of the art includes low profile LF antennas with air coils or flat coreless coils that are quite wide in terms of area. When the overall available area is restricted, the Z Magnetic Induction is unable to induce a minimum voltage in the air, so a relatively high effective magnetic permeability is needed.

There are low profile solutions in the market for Card Type keyless entry key fobs, most of them use discrete low profile components, typically two identical low profile antennae for X and Y axis and either a flat coreless coil or a small low profile Z-axis coil made with a ferrite drum core. None of these solutions are suitable to be integrated in a smartphone. Even with the use of low profile nano-crystalline cores or amorphous cores like the ones described by Hitachi Metals, the total surface target is not met.

Other documents are known which have the Z-winding wounded around, without including said Z-winding in a perimetric recess of a monolithic magnetic core, but this solution does not provide a good sensitivity of the Z-winding over 50 mV/Amv.

Therefore, the cited documents, and other similar documents, do not provide a solution which could be miniaturized in order to provide an ultra-low-profile antenna having a good sensibility in the Z-winding.

EP 17382805 patent application discloses a solution providing an ultra-low profile triaxial LF antenna for integration in a mobile phone, in which a small magnetic core with coils is wound in winding grooves in three intersecting axial directions, and wherein the antenna also comprises a first soft-magnetic sheet perpendicular to the Z-axis (Z) and attached to flat faces of four corner protuberances of the magnetic core, said flat faces being perpendicular to the Z-axis (Z) and the X winding coil (DX) and the Y winding coil (DY) becoming partially covered by said first soft magnetic sheet that has a size in the X- and Y-axis directions that covers the Z-winding coil DZ providing a limiting edge for the Z-winding (DZ) so that an increase of the sensitivity of the Z-winding coil (DZ) and a reduced thickness of the antenna in the Z-axis (Z) direction are obtained.

The present invention provides another alternative structure based on a very small flattened drum-like shape magnetic core as well as a production method of an ultra-low-profile low frequency antenna, involving the manufacture of said small magnetic core.

BRIEF DESCRIPTION OF THE INVENTION

The present invention is directed, according to a first aspect of the invention, to an ultra-low-profile triaxial low frequency antenna for integration in a mobile phone, such as a smartphone.

As previously indicated, the inclusion of a triaxial low frequency antenna in mobile phones requires the reduction of the thickness of the antenna maintaining its performance and without increasing the other dimensions thereof. Also bending resistance of the antenna has to be improved.

The proposed ultra-low-profile triaxial low frequency antenna includes, as known in the field:

- a flat magnetic core, made of a soft-magnetic non-electro conductive material having coil winding channels in three intersecting axial directions defining X-axis (X), Y-axis (Y) and Z-axis (Z) orthogonal to each other wherein:
- the magnetic core includes a flat central region and four corner protuberances spaced apart to each other around said central region, said corner protuberances defining therebetween a X-coil winding channel surrounding the central region around the X-axis (X), and a Y-coil winding channel surrounding the central region around the Y-axis (Y) wherein the X-coil winding channel and the Y-coil winding channel being at different heights;
- a Z-coil winding channel surrounds the magnetic core around the Z-axis (Z), said Z-coil winding channel being defined by a discontinuous groove confined between two parallel surfaces which are perpendicular to the Z-axis (Z) providing for example a rectangular cross section, said discontinuous groove including four partial grooves each included in one of the corner protuberances, being the X-coil winding channel, the Y-coil winding channel and the Z-coil winding channel orthogonal to each other;
- a X-coil (DX) is wound around the X-axis (X) contained within the X-coil winding channel, a Y-coil (DY) is wound around the Y-axis (Y) contained within the Y-coil winding channel (12Y), and a Z-coil (DZ) is wound around the Z-axis (Z) contained within the Z-coil winding channel (12Z), wherein each of the coils comprises an electroconductive wire; and
- the X-coil (DX), the Y-coil (DY) and the Z-coil (DZ) being made of conductive wire, and each having a conductive wire entry and a conductive wire exit connected to a respective electrical connection terminal.

The arrangement of the coils surrounding the coil winding channels orthogonal to each other of the magnetic core, determine that when an electromagnetic field cross over the mentioned X- Y- and Z-coils (DX, DY, DZ), an electric potential is generated between each wire ends according to the faraday law.

An expert will be aware that said construction will also generate, when a current circulates through the mentioned X- Y- and Z-coils, electromagnetic fields with electromagnetic field vectors coaxial with the axes of each of the windings.

The described features provide a triaxial antenna which can be optimized for a low frequency range of signals, preferably in the range of 30 kHz to 300 kHz.

Starting from this known magnetic core structure and orthogonal arrangement of the coils on it, the present invention proposes a series of improvements to achieve the objectives explained above of designing the antenna to minimize its size, particularly in height and allowing its effective integration into a smartphone.

For this purpose, according to this invention:

- the thickness of the magnetic core in the Z-axis (Z) direction is of less than 1.2 mm and preferably less than 1 mm;
- each discontinuous groove is narrow and deep being the width of each discontinuous groove in the Z-axis (Z) direction equal or less than 0.4 mm (preferably 0.3 mm) and being the depth of each discontinuous groove in a radial direction perpendicular to the Z-axis (Z) direction at least two times the width thereof; and
- the Z-coil (DZ) is wound within said Z-coil winding channel inserted in said narrow deep groove and extending radially from one third to two thirds of the depth of the groove, and the outer edge of the Z-coil wound in the Z-coil winding channel is at a distance of the entrance of the groove so that the parallel surfaces of the coil winding channel extend in cantilever beyond said outer edge, so contributing to increase the sensitivity of the Z-coil due to an enlarged cross section in regard to the Z-axis (Z).

In an embodiment, an inner edge of said Z-coil is at a distance of said X-coil and Y-coil.

In a particular embodiment, said configuration, or the additional configurations described in this document, provides the Z-winding with sensitivity over 50 mV/Amv.

As opposed to the solutions disclosed in cited U.S. Pat. No. 7,042,411 and US 2013033408 in this invention no base or bobbin attached to the magnetic core is used; therefore the electrical connection terminals are directly attached to a flat surface of the cited corner protuberances. In this way the thickness in height of the antenna is even more minimized.

In an embodiment, the antenna is encapsulated by an electro insulating resin coating providing a casing with a coating thickness between 0.2 and 0.3 mm. Only the connection terminals will be partially not covered by said electro-insulant material. The connection terminals can be folded against the electro-insulant material, defining connection terminals overlapped to the casing of the antenna.

The conductive wire for the X, Y and Z coils can be an insulated high thermal resistant wire up to 220° C. (which is needed for the production method to be described below) and can have a diameter in a range between 0.020 mm-0.040 mm.

The extension of the magnetic core in the X-axis and in the Y-axis, directions is preferably equal or less than 140 $mm^2$. As a preferred or particular embodiment this size is 10.60 mm×11.60 mm.

The thickness of the antenna in the Z-axis direction is preferably equal or less than 1.4 mm, i.e. less than 1.6 mm which is the maximum thickness for an element which can be included in a regular mobile phone.

Preferably the magnetic core is a high-density ferrite core. Even more preferably the magnetic core is a ferrite core of a Nickel Zinc alloy or of a Manganese Zinc alloy.

In a second aspect the invention refers to a production method of an ultra-low-profile low frequency antenna, to manufacture the triaxial antenna of the first aspect of the invention previously described. As known in the field, the method comprises:

- obtaining a magnetic core by:
  - compacting in a mold an amorphous powder of soft-magnetic non-electro conductive material shaping a flat drum-like magnetic core including a flat central region and four corner protuberances spaced apart to each other around said central region, said corner protuberances defining therebetween a X-coil winding channel surrounding a central region around the X-axis (X), and a Y-coil winding channel surrounding the central region around a Y-axis (Y);
  - creating a Z-coil winding channel that surrounds the magnetic core around the Z-axis (Z) by a cutting or sawing process of the compacted flat magnetic core, said Z-coil winding channel being defined by a discontinuous groove confined between two upper and lower surfaces of the core, and said discontinuous groove including four discontinuous grooves each included in one of the corner protuberances;
  - oven-sintering the magnetic core producing its crystallization, shrinking and hardening;
  - arranging a X-coil (DX) wound around the X-axis (X) contained within the X-coil winding channel, a Y-coil (DY) wound around the Y-axis (Y) contained within the Y-coil winding channel, and a Z-coil (DZ) wound around the Z-axis (Z) contained within the Z-coil winding channel; and
  - connecting a conductive wire entry and a conductive wire exit of each of said X-coil, Y-coil and Z-coil to a respective connection terminal.

Unlike the proposals known in the field, in the proposed method, in order to obtain a magnetic core with the dimensions and configuration previously explained, each of the four discontinuous grooves cut into the magnetic core and previous to the oven sintering process has a trapezial cross section in a radial sectional plane coincident with the Z-axis (Z), said trapezial cross section being produced by a tapered saw during the sawing process, and being said trapezial cross section defined to become a rectangular cross section (cross section of the Z-coil winding channel) after the crystallization, shrinking and hardening.

In an embodiment, the conductive wire entry and the conductive wire exit of each of said X-coil, Y-coil and Z-coil (made of insulated high thermal resistant wire up to 220° C. and with a diameter of 0.020 mm-0.040 mm) are connected to the respective connection terminal by a laser welding process.

Furthermore, as a last step of the production method, the assembly of the core and coils can be embedded in a resin casing and connected to a PCB by a reflow soldering process in an oven. For this reason, the electroconductive wires used for the coils must be able to withstand temperatures of up to 200° C., even if they are of short-duration.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and not limitative, in which.

DETAILED DESCRIPTION OF AN EMBODIMENT

Figure 1:
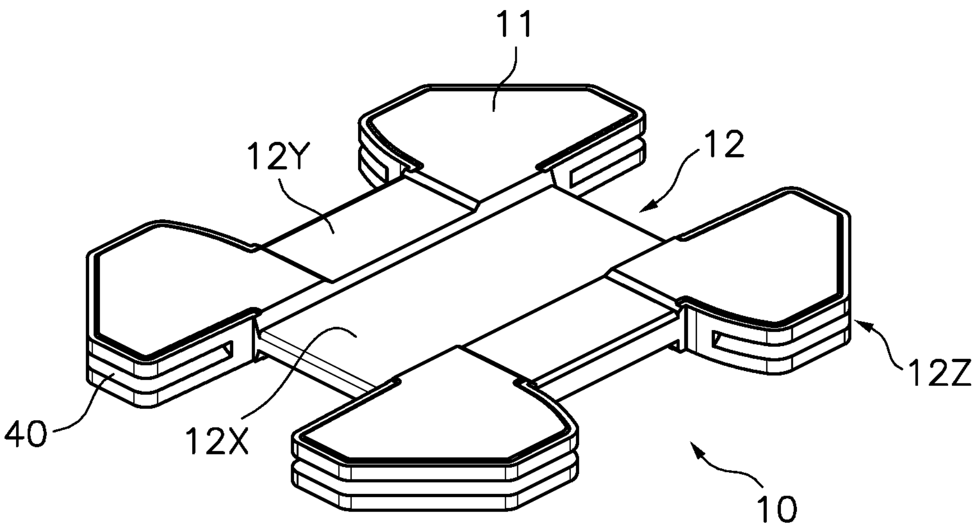
FIG. 1 shows a first perspective view of the magnetic core of the ultra-low-profile antenna of this invention.
Figure 2:
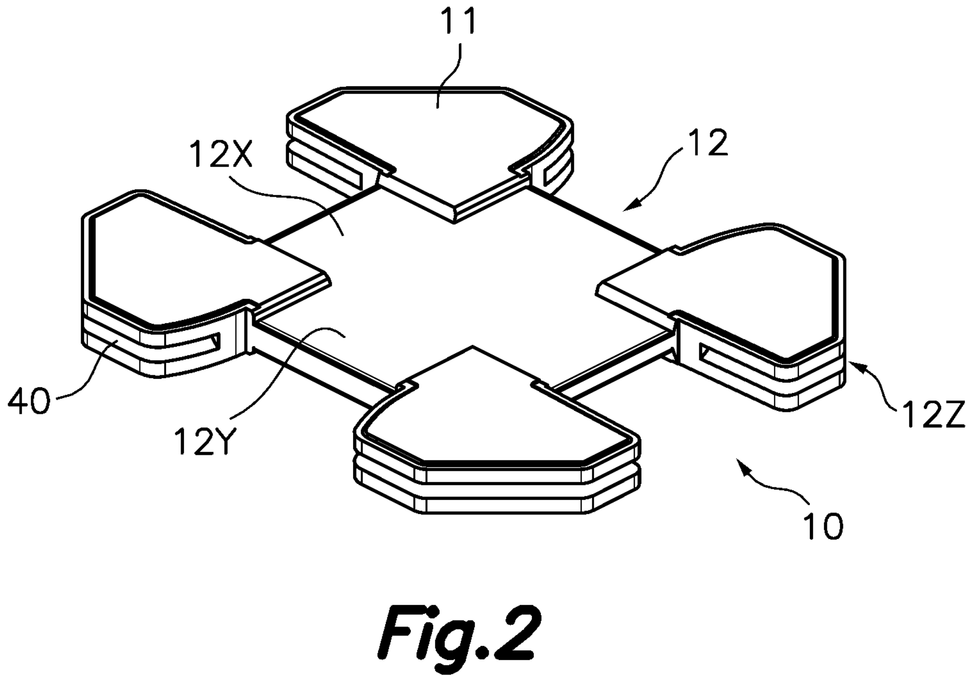
FIG. 2 is a second perspective view of the magnetic core showing the opposite greater face

The foregoing and other advantages and features will be more fully understood from the following detailed description of an embodiment with reference to the accompanying drawings, to be taken in an illustrative and not limitative, in which:

FIGS. 1 and 2 show the magnetic core 10 of the proposed ultra-low-profile antenna, which is made of a soft-magnetic non-electro conductive material such as a ferrite made of a Nickel Zinc alloy or made of a Manganese Zinc alloy, the core 10 having coil winding channels 12X, 12Y and 12Z in three intersecting axial directions orthogonal to each other.

The magnetic core 10 includes a central region 12 and four corner protuberances 11 spaced apart to each other around said central region 12. The corner protuberances 11 define therebetween a X-coil winding channel 12X surrounding the central region 12 around the X-axis X, a Y-coil winding channel 12Y surrounding the central region 12 of the core around the Y-axis Y, and a Z-coil winding channel 12Z surrounding the magnetic core 10 around the Z-axis Z, being the X-coil winding channel 12X, the Y-coil winding channel 12Y and the Z-coil winding channel 12Z orthogonal to each other.

The Z-coil winding channel 12Z is defined by a discontinuous groove confined between two parallel upper and lower surfaces of the core 10 which are perpendicular to the Z-axis Z providing a rectangular cross section, the discontinuous groove including four partial grooves 40 each included in one of the corner protuberances 11.

Figure 6:
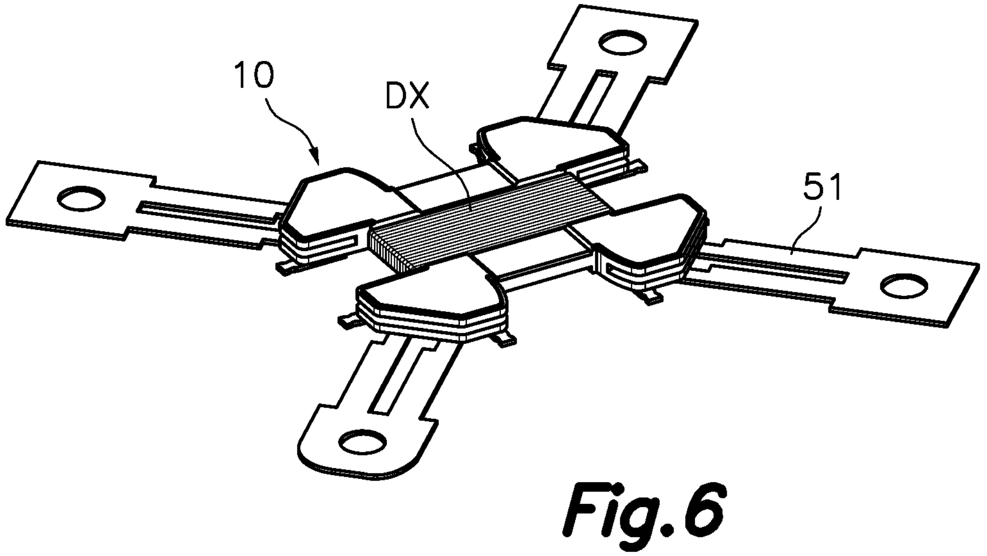
FIG. 6 is a perspective view equivalent to FIG. 5 but including the first X-coil wound around the X-coil winding channel.
Figure 7:
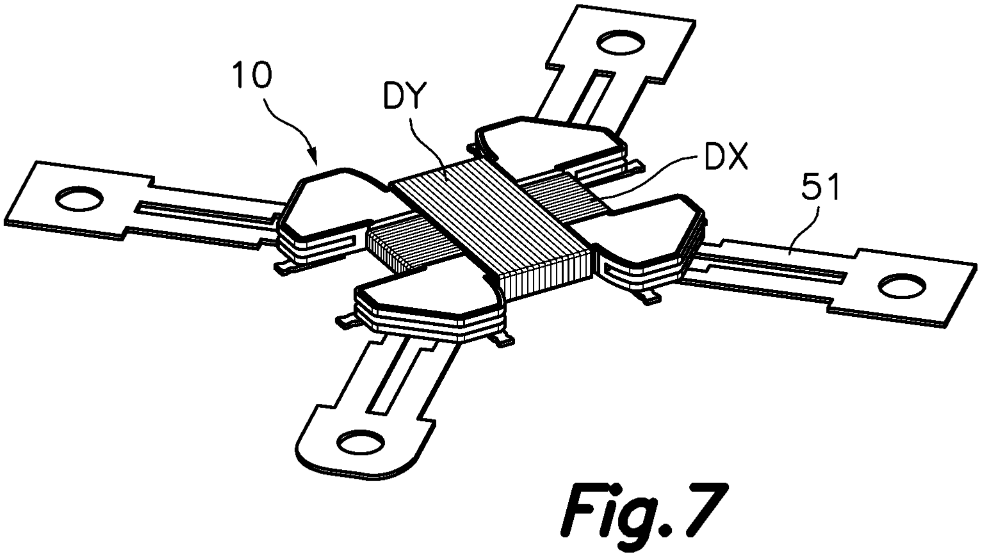
FIG. 7 is a perspective equivalent to FIG. 5 but including both the X-coil and Y-coil respectively wound around the X-coil winding channel and Y-coil winding channel.
Figure 8:
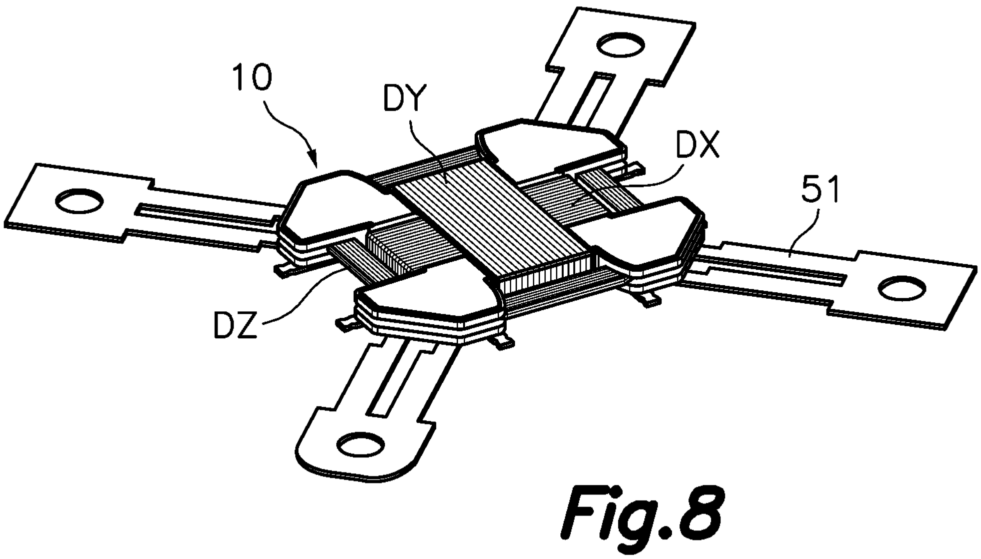
FIG. 8 shows another perspective view, equivalent to that of the previous FIGS. 5 to 7, but in this case with the three X-coil, Y-coil and Z-coil respectively wound around the X-coil winding channel, Y-coil winding channel and Z-coil winding channel.

As shown in FIGS. 6, 7 and 8, a X-coil DX is wound around the X-axis X contained within the X-coil winding channel 12X, a Y-coil DY is wound around the Y-axis Y contained within the Y-coil winding channel 12Y, and a Z-coil DZ is wound around the Z-axis Z contained within the Z-coil winding channel 12Z.

The X-coil DX, the Y-coil DY and the Z-coil DZ are made of conductive wire, and each has a conductive wire entry and a conductive wire exit connected to a respective connection terminal 30.

According to the teachings of present invention, following special features are implemented:

Firstly, the thickness of the magnetic core 10 in the Z-axis Z direction is of less than 1.2 mm and preferably equal or less than 1 mm.

Each partial groove 40 is narrow and deep, being the width of each partial groove 40 in the Z-axis Z direction equal or less than 0.4 mm, and preferably around 0.3 mm, and being the depth of each partial groove 40 in a radial direction perpendicular to the Z-axis Z direction at least two times the width thereof.

Likewise, the Z-coil DZ is wound within said Z-coil winding channel 12Z inserted in said narrow deep groove 40 and extends radially from ⅓ to ⅔ of the depth of the groove 40. The outer edge of the Z-coil wound in the Z-coil winding channel 12Z is at a distance of the entrance of the groove 40 (see FIGS. 8 and 9) so that the parallel surfaces extent in cantilever beyond said outer edge.

Figure 9:
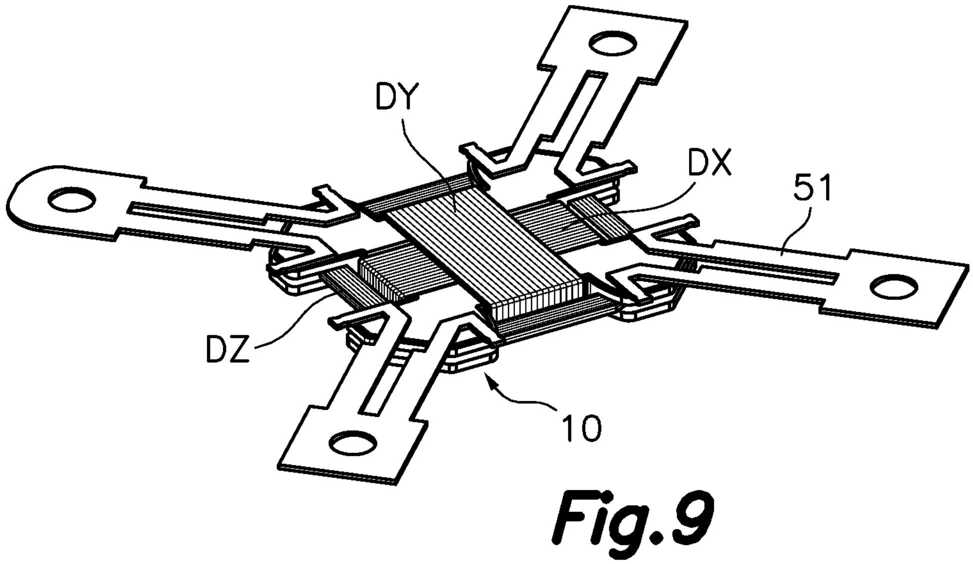
FIG. 9 is the same figure as FIG. 8, but seen from the bottom showing the layout of the extension tabs of the lead frame from which the connecting terminals will be formed.
Figure 10:
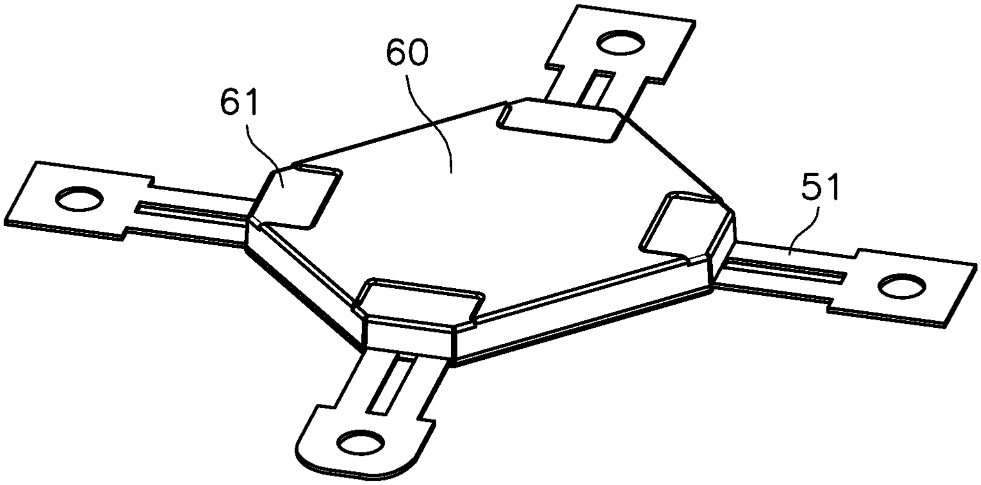
FIG. 10 shows the assembly of the core and extension tabs with the core covered by a layer of epoxy resin and FIG. 11 is the equivalent view but seen from the top part.
Figure 11:
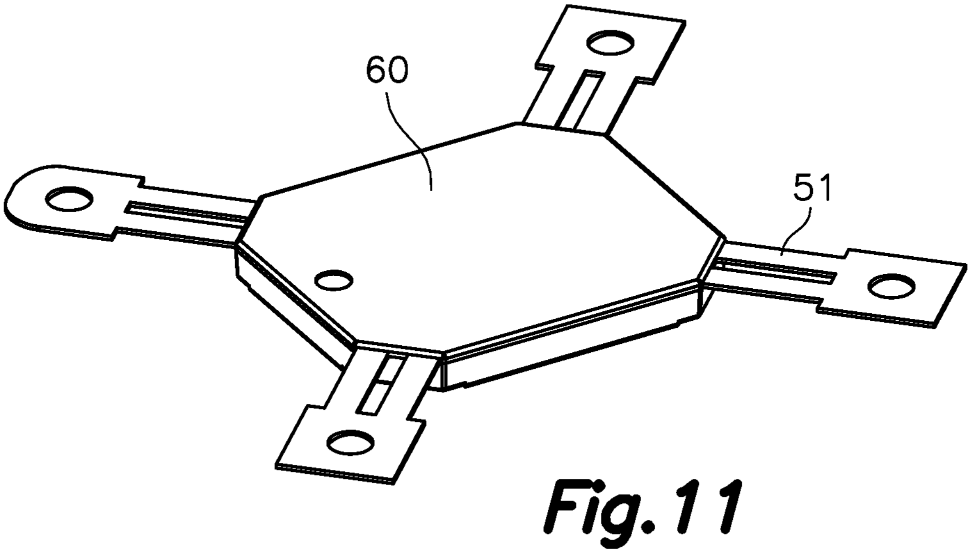

As can also be seen in FIGS. 8 and 9 the inner edge of said Z-coil is at a distance of said X-coil and Y-coil.

The conductive wire for the coil is an insulated high thermal resistant wire up to 220° C. and has a diameter comprised in a range between 0.020 mm-0.040 mm.

As can be seen in FIGS. 1 and 2 one of the central regions located in one of the larger faces of the core 10 includes a recess defining the X-coil winding channel 12X while the other opposite central region (see FIG. 2) is flat. This allows the magnetic core be manufactured without risk of breakage in this central part, as this central part has a total thickness of about 0.60 mm. Taking into account the small diameter of the insulated conductive wire and the development in width of each of the X coil and Y-coil the lack of a recess for the X-coil in one of the larger faces of the core is avoidable since this does not impose an excessive bulging of the superimposed wound coils DX and DY.

As illustrated in FIGS. 5 to 9, connection terminals 30 are directly attached to a flat surface of said corner protuberances.

Figure 3:
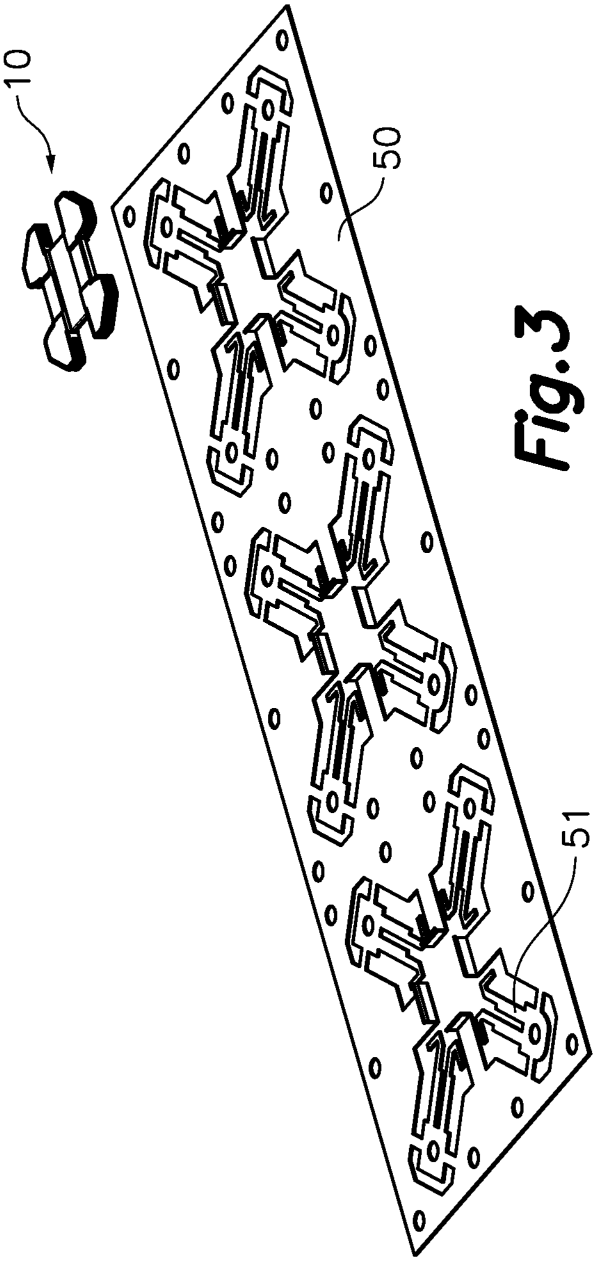
FIGS. 3 and 4, illustrate the association of the magnetic core to a lead frame providing the connecting terminals, FIG. 4 showing the final arrangement of the core in a space of reception of the lead frame.
Figure 4:
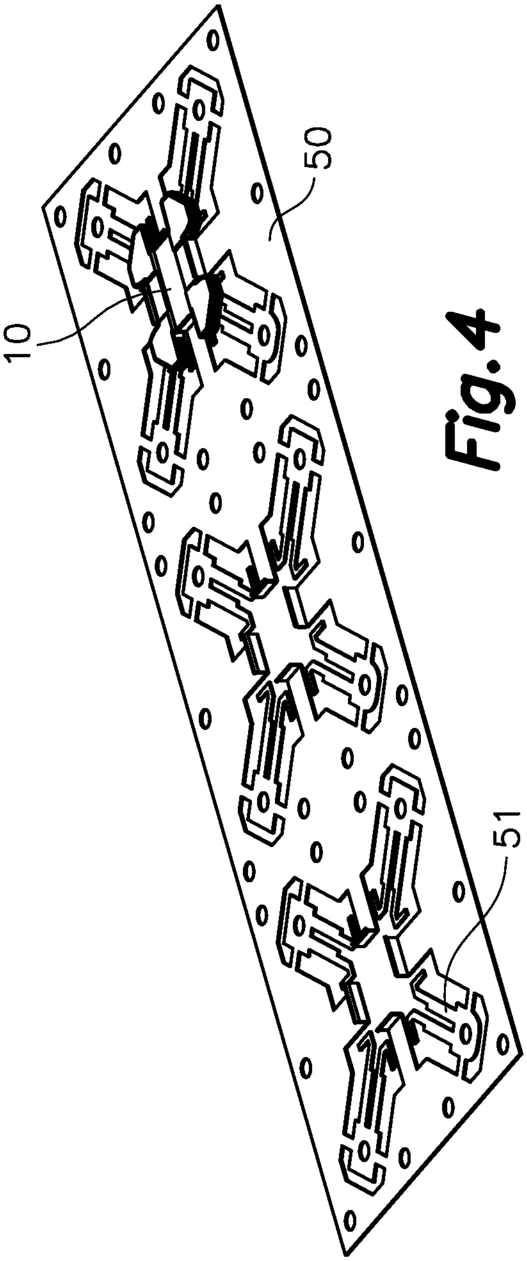
Figure 5:
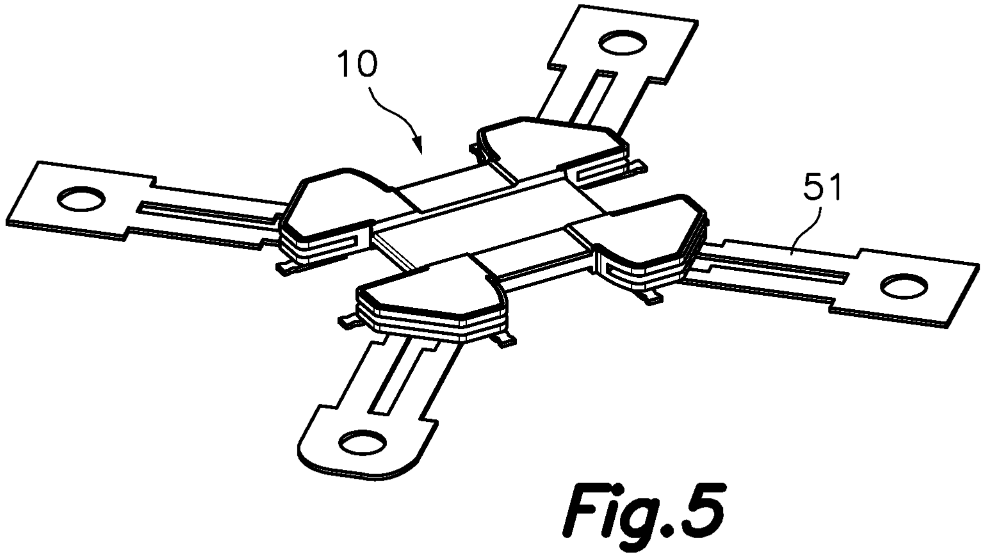
FIG. 5 is a perspective view illustrating the arrangement of the extension tabs from the lead frame providing the connecting terminals with regard to the magnetic core.

FIGS. 3 and 4 show how the core 10 is attached to a lead frame 50 which has cut out some extension tabs 51 from which the connecting terminals 30 will be obtained by cutting.

The core 10 with its coils DX, DY and DZ is encapsulated by an insulating resin coating 60 with a coating thickness between 0.2 and 0.3 mm. This can be seen in FIGS. 10 to 13.

Figure 12:
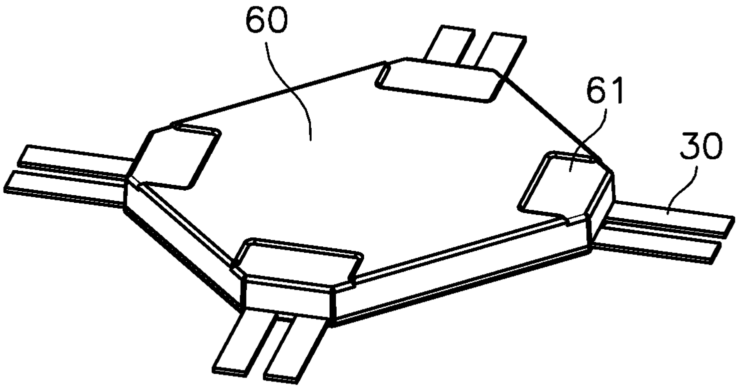
FIG. 12 is equivalent to FIG. 10 but with the extension tabs cut providing the 8 connecting terminals.
Figure 13:
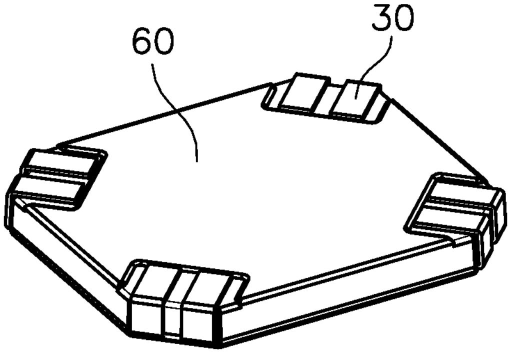
FIG. 13 is a figure equivalent to FIG. 12 but with the connecting terminals folded against the body of the casing provided by the epoxy resin coating.

FIGS. 12 and 13 show the connection terminals 30 folded against the electro-insulant material, defining connection terminals overlapped to recessed portions 61 the casing 60 of the antenna.

In a second aspect this invention refers to a production method of an ultra-low profile low frequency antenna, the method including according to know procedures:

obtaining a magnetic core by:

compacting in a mold an amorphous powder of soft-magnetic non-electro conductive material shaping the magnetic core 10 including a flat central region 12 and four corner protuberances 11 spaced apart to each other around said central region 12, said corner protuberances 11 defining therebetween a X-coil winding channel 12X surrounding the central region 12 around the X-axis X, and a Y-coil winding channel 12Y surrounding the central region 12 around a Y-axis Y;

creating a Z-coil winding channel 12Z surrounding the magnetic core 10 around the Z-axis Z by a cutting or sawing process, said Z-coil winding channel 12Z being defined by a discontinuous groove confined between two upper and lower surfaces of the core 10, said discontinuous groove comprising four partial grooves 40 each included in one of the corner protuberances 11;

oven-sintering the magnetic core 10 producing its crystallization, shrinking and hardening;

arranging a X-coil DX wound around the X-axis X contained within the X-coil winding channel 12X, a Y-coil DY wound around the Y-axis Y contained within the Y-coil winding channel 12Y, and a Z-coil DZ wound around the Z-axis Z contained within the Z-coil winding channel 12Z; and connecting a conductive wire entry and a conductive wire exit of each of said X-coil, Y-coil and Z-coil to a respective connection terminal 30.

According to this invention and mainly for the purpose of manufacturing a magnetic core with the dimensions and configuration previously explained, previous to the oven-sintering process each of the four partial grooves 40 of the magnetic core 10 is cut to have a trapezial cross section in a radial sectional plane coincident with the Z-axis Z, said trapezial cross section being produced by a tapered saw during the sawing process, being said trapezial cross section defined to finally take a rectangular cross section shape after the crystallization, shrinking and hardening due to the oven sintering process.

In addition, the connection of the wire entry and the conductive wire exit of each of said X-coil DX, Y-coil DY and Z-coil DZ to the respective connection terminal 30 can be performed by a laser welding process.

As a final step, the assembly of the core 10 and coils DX, DY and DZ can be embedded in a resin casing 60 and connected to a PCB (not shown) by a reflow soldering process in an oven.

The ultra-low-profile triaxial antenna of this invention has been particularly designed for its integration in a smartphone, in particular to operate as a key-less system. Therefore, a mobile phone (or other portable computer device) integrating the proposed antenna will also include a software application installed therein providing a user interface for controlling operation of the proposed ultra-low-profile tri-axial low frequency antenna.

It will be understood that various parts of one embodiment of the invention can be freely combined with parts described in other embodiments, even being said combination not explicitly described, provided there is no harm in such combination.

The scope of the present invention is defined in the following set of claims.

The invention claimed is:

1. An ultra-low profile low frequency antenna comprising a magnetic core made of a soft-magnetic non-electro conductive material, the magnetic core having coil winding channels in three intersecting axial directions orthogonal to each other, defining X-axis (X), Y-axis (Y) and Z-axis (Z) orthogonal to each other wherein:

the magnetic core includes a flat central region and four corner protuberances spaced apart to each other around said central region, said corner protuberances defining therebetween a X-coil winding channel surrounding the central region around the X-axis (X), and a Y-coil winding channel surrounding the central region around the Y-axis (Y); and a Z-coil winding channel surrounds the magnetic core around the Z-axis (Z), said Z coil winding channel being defined by a discontinuous groove confined between two parallel surfaces which are perpendicular to the Z-axis (Z) providing a rectangular cross section, said discontinuous groove including four partial grooves each included in one of the corner protuberances;

a X-coil (DX) is wound around the X-axis (X) contained within the X-coil winding channel, a Y-coil (DY) is wound around the Y-axis (Y) contained within the Y-coil winding channel, and a Z-coil (DZ) is wound around the Z-axis (Z) contained within the Z-coil winding channel; and the X-coil (DX), the Y-coil (DY) and the Z-coil (DZ) being made of conductive wire, and each having a conductive wire entry and a conductive wire exit connected to a respective connection terminal, the magnetic core (10) is monolithic and has a flattened drum-like shape;

the thickness of the magnetic core in the Z-axis (Z) direction is of less than 1.2 mm;

each partial groove is narrow and deep being the width of each partial groove in the Z-axis (Z) direction equal or less than 0.4 mm and being the depth of each partial groove in a radial direction perpendicular to the Z-axis (Z) direction at least two times the width thereof; and the Z-coil (DZ) is wound within said Z-coil winding channel inserted in said narrow deep groove and extending radially from ⅓ to ⅔ of the depth of the groove and the outer edge of the Z-coil wound in the Z-coil winding channel, is at a distance of the entrance of the groove so that the parallel surfaces extent in cantilever beyond said outer edge.

2. The antenna of claim 1, wherein said connection terminals are directly attached to a flat surface of said corner protuberances.

3. The antenna according to claim 1, wherein an inner edge of said Z-coil is at a distance of said X-coil and Y-coil.

4. The antenna according to claim 1, wherein the conductive wire is an insulated high thermal resistant wire up to 220° C. and has a diameter of 0.020 mm-0.040 mm.

5. The antenna according to claim 1, wherein the antenna is encapsulated by an insulating resin coating with a coating thickness between 0.2 and 0.3 mm.

6. The antenna according to claim 1, wherein the thickness of the magnetic core is less than 1 mm and the width of the partial grooves is of 0.3 mm.

7. The antenna according to claim 1, wherein the extension of the core in the X-axis and in the Y-axis directions is preferably equal or less than 140 $mm^2$.

8. The antenna according to claim 1, wherein the magnetic core is a high density molded ferrite core or a high density molded ferrite core made of a Nickel Zinc alloy or made of a Manganese Zinc alloy.

9. The antenna according to claim 1, wherein one of the central regions located in a larger face of the core includes a recess defining the X coil winding channel 12X and the opposite region is flat.

10. A method of producing the ultra-low profile low frequency antenna of claim 1 comprising:

obtaining a monolithic, flattened drum-like shape magnetic core by:

compacting in a mold powder of soft-magnetic non-electro conductive material shaping the magnetic core including a flat central region and four corner protuberances spaced apart to each other around said central region, said corner protuberances defining therebetween a X-coil winding channel surrounding the central region around the X-axis (X), and a Y-coil winding channel surrounding the central region around a Y-axis (Y);

creating a Z-coil winding channel surrounding the magnetic core around the Z-axis (Z) by a sawing process, said Z-coil winding channel being defined by a discontinuous groove confined between two surfaces, said discontinuous groove including four partial grooves each included in one of the corner protuberances;

oven-sintering the magnetic core producing its crystallization, shrinking and hardening;

arranging a X-coil (DX) wound around the X-axis (X) contained within the X-coil winding channel, a Y-coil (DY) wound around the Y-axis (Y) contained within the Y-coil winding channel, and a Z-coil (DZ) wound around the Z-axis (Z) contained within the Z-coil winding channel (12Z); and connecting a conductive wire entry and a conductive wire exit of each of said X-coil, Y-coil and Z-coil to a respective connection terminal, wherein each of the four partial grooves of the magnetic core and previous to the oven-sintering process has a trapezial cross section in a radial sectional plane coincident with the Z-axis (Z), said trapezial cross section being produced by a tapered saw during the sawing process, and being said trapezial cross section defined to become a rectangular cross section after the crystallization, shrinking and hardening.

11. The method according to claim 10, wherein the conductive wire entry and the conductive wire exit of each of said X-coil, Y-coil and Z-coil are connected to the respective connection terminal by a laser welding process.

12. The method according to claim 10, wherein the assembly of the core and coils are embedded in a resin casing and connected to a PCB by a reflow soldering process in an oven.

* * * * *